Jan. 21, 1930.   F. VOREL   1,744,288
STEAM ENGINE
Filed April 24, 1926
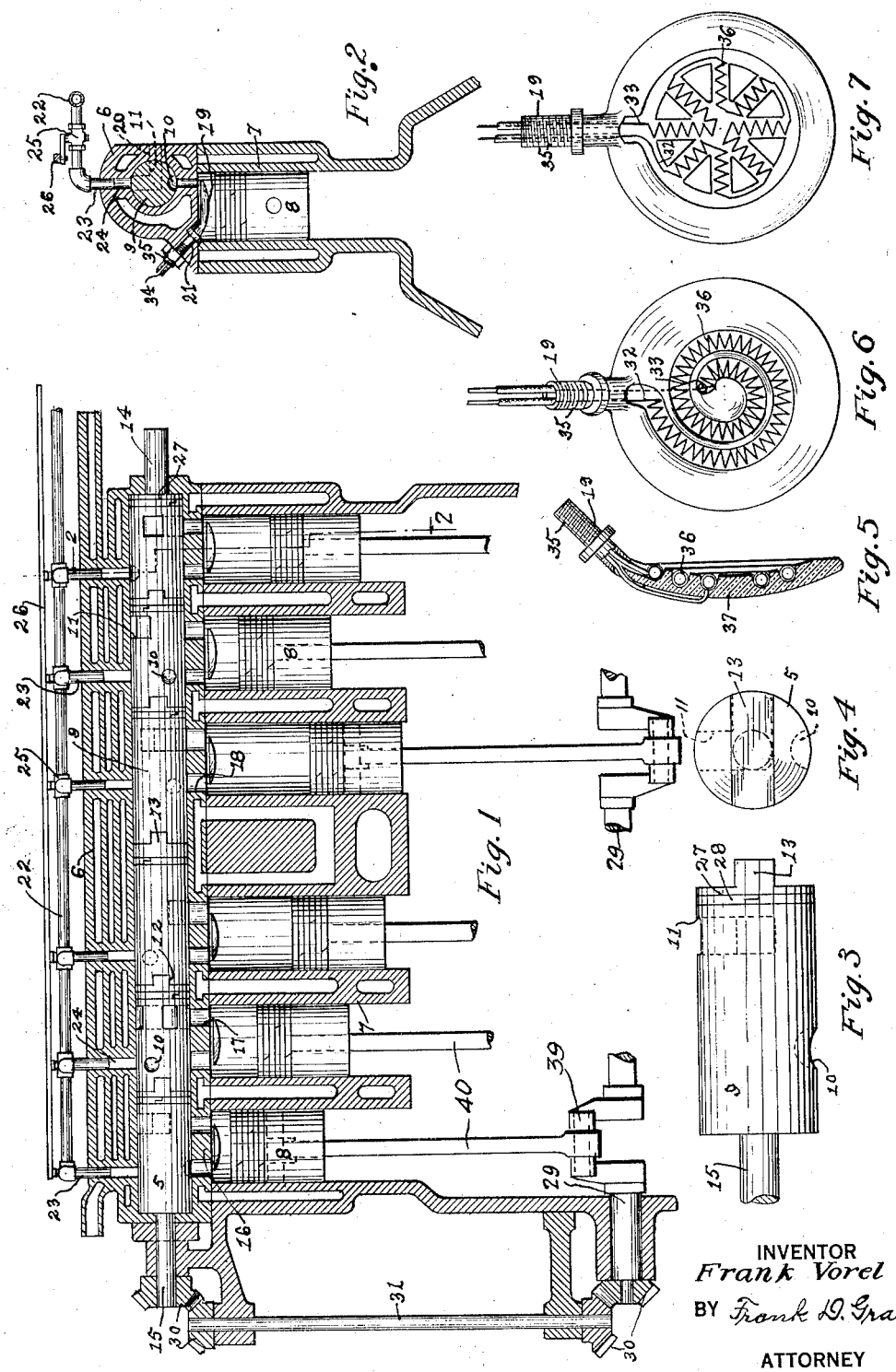
INVENTOR
*Frank Vorel*
BY *Frank D. Gray*
ATTORNEY Patented Jan. 21, 1930

1,744,288

UNITED STATES PATENT OFFICE

FRANK VOREL, OF CLEVELAND, OHIO

STEAM ENGINE

Application filed April 24, 1926. Serial No. 104,326.

This invention relates to steam engines, and especially to such engines in which the steam is generated in the several cylinders thereof, no engine boiler being required, since small particles of liquid are conveyed directly to the cylinders and quickly heated therein just as the pistons are about to advance. My invention has therefore for an object to generate power in one or more piston cylinders by feeding liquid thereto as required and accomplishing all the advantages of expansion of the liquid as it is suddenly changed to steam back of the pistons without requiring the great weight necessitated formerly by the use of a steam boiler for generating steam therein and conveying the steam rather than the liquid to the cylinders.

It is a further object of my invention to arrange the cylinders, when a plurality of them are used, in side-by-side relation, and in alinement, if more than two are used, and to provide a rotary valve having sections for determining the transmission of liquid to the respective cylinders. This composite valve is not provided for directing steam into the cylinders, but for providing liquid inside the cylinders where the liquid may be suddenly changed to steam.

It is a further object of my invention to provide the several cylinders of my engine with connections from an external source of electric current, through the walls of the cylinders to heating coils within the cylinders for the purpose of generating heat to transmute liquid therein to steam under pressure for actuating the pistons in the cylinders as will be understood.

A still further object of my invention herein disclosed, comprises a means in the valve casing and in the valve itself, for intermittently feeding small quantities of liquid to the various cylinders for evaporation and consequent generation of steam therefrom by said heat mechanisms in the cylinders.

With these and other objects in view, I have invented a construction embodying the features herein described and illustrated in the accompanying drawings, in which—

Figure 1 is a vertical longitudinal section through the upepr part of a multi-cylinder steam engine embodying my improvements;

Figure 2 is a transverse sectional view of the same taken in planes indicated by the broken line 2—2 of Fig. 1;

Figure 3 is a side elevation of a section of the composite rotary valve used in my engine;

Figure 4 is an end view of a valve section;

Figure 5 is a central transverse section of a heating coil and its support;

Figure 6 is a plan view of a heating coil and its connected parts, and

Figure 7 is a plan view of another form of heating coil.

In the improvement illustrated, the rotary valve shaft 5 is mounted in a water-cooled casing 6 above alined cylinders 7 carrying pistons 8. The construction shown embodies an engine having six cylinders, though it is to be understood that any number of cylinders may well be used in my improved engine. In any event, this engine is without an external boiler, the steam or other gas exerting force against the several pistons 8, being generated within the cylinders themselves, as hereinafter explained.

The said shaft 5 is composed of cylinder sections 9, one for each cylinder. These sections may be solid, and are so shown, though it is understood that a somewhat different type of rotary valve shaft may be used with my battery of cylinders and the means disclosed for generating the gas therein. The essential features of this shaft are that the latter shall be provided on its circumferential surface, or its sections if it be formed of sections, with stockets 10 for holding therein small quantities of liquid which latter is to be fed into registry with the several cylinders 7, and with transverse ports or apertures 11 for permitting exit of gas or steam from the cylinders when the pistons 8 are about to recede on the in-stroke, as will be later explained.

When made in sections, the latter will ordinarily be keyed together by suitable slots 12 and keys 13 provided at their ends, the key of one section entering the slot of the next, and the end sections provided with reduced shaft ends 14 and 15, respectively, which extend outwardly in suitable bearings in the frame. The cylinder heads 16 will be provided also with an opening 17 in register with the ports 11 of the shaft, openings 18 to register with the sockets 10, and a further opening in each head 16 to receive therethrough the heating means 19.

Since my improved engine is not designed to explode a gas to produce the extreme compression essential for the power required, not explosive in the usual sense as the term is used in internal combustion engines, no intake port to receive gases or an explosive liquid is at all necessary, but an exhaust port 20 is shown in Fig. 2 in dotted lines which represents the aperture in the casing with which the port 11 of the shaft section is regularly brought in register This port of a shaft section is suitably formed as passages through the valve section but with the ends opening out at about a quadrant distance apart on the periphery of the shaft, as shown in Fig. 2, so that at one position of the shaft 5, the said end openings of the port will register with ports 17 and 20, respectively, of the casing.

Above the casing 6 is provided a supply pipe 22 parallel with the casing and having angular feed tubes 23 directed downward from the pipe and arranged to be inserted into casing ports 24 which are in the same transverse plane of the various shaft sockets 10, for an obvious purpose. Suitable valves 25 connect the said tubes 23 with the pipe 22 which are adapted to be actuated in unison by a bar 26 or other means of operation.

The several shaft sections 9 are provided with at least one peripheral groove 27 in which is seated an expansion ring 28 which is normally expanded to contact the shaft casing on its interior. The crank shaft 29 is geared to the reduced shaft end 15 of the valve shaft 5 by means of bevel gears 30 and an intermediate vertical shaft 31 whereby the rotation of the crank shaft 29 rotates the valve, and at the same speed of rotation, since the gears 30 are of the same size. By this arrangement it is clear that an expulsive force will be exerted against each piston on each out-stroke thereof, or in other words, it is a two-cycle engine.

At the port end of the several cylinders and just within the said ends I provide a means of heating the small quantity of liquid that is carried in the sockets 10 by the valve shaft and thus delivered into the port 18 of the cylinder head so that this liquid falls into the interior of the cylinder and upon said heating means 19. This latter numeral is used to designate the heating mechanism as a whole, as used for each cylinder. It is illustrated in Figs 5, 6 and 7, and comprises a structure electrical in its character, a coil of resistance material being located within the cylinder just beneath the cylinder head, the ends of such coils connected at 32 and 33 with the conductors 34 leading outward through suitable sleeves 35 seated in the before mentioned openings 21. The said conductors will be connected with suitable supply of electrical energy, usually the direct current, so that the said coils 36, as applied to the structure in Figs. 5 and 6 will be heated to a very high temperature and thereby serve to generate steam from the liquid deposited on said coils through the openings 18 from the sockets 10, and to produce such generation very suddenly and completely, because the said resistance coils 36 are seated in the concave surface of support plates 37, one in each cylinder, the support plates being of insulating material, and the sockets therein serving to hold the liquid deposited therein until the steam is generated. The arrangement of said coils 36 may be varied according to particular conditions. I have shown it as a spiral in Figs. 5 and 6, and in a radial arrangement in Fig. 7, in either case the coils being seated in the concavity of the plate 37

Operation:—It is clear therefore, that I rotate a crank shaft by a battery of pistons in much the same manner as it is actuated by the cranks of internal combustion engines, except that there need be no compression of a gas in the cylinder just before combustion. Liquid is fed into the ports 24 and thereby fills the sockets 10 of the several sections of the valve shaft, which sockets direct the proper quantity of liquid to the heated coils 36. The coils remain highly heated continuously, and receive the liquid once for each revolution of the said shaft. At the time that the steam is generated by the deposit of the liquid on the resistance coils, the ports 11 are closed, but when the socket lacks a quadrant's distance of reaching the lowest position of the socket, as shown in Fig. 2, the port 11 is in such position that the port 17 is in registry with port 20 of the shaft casing. At this point, it is evident that the recession of the piston into the cylinder will drive the expanded and more or less condensed steam from the cylinder out through the port 11 and through the opening 20 into the outer air. A further rotation of the shaft 5 will carry the port 11 out of registry with the opening 20, so that the cylinder will then be closed until the socket 10 of the shaft is brought into registry with the port 18, at which time a new quantity of liquid carried by the socket from the port 24 to port 18, will drop this liquid into the cylinder at the rear of the piston, and directly upon the heated coil 36 in the concavity of the plate 37, whereby the liquid will there be suddenly changed to steam under high pressure and tend to force the piston outward as before upon the further rotation of the crank shaft.

The arrangement of the several cranks, when a plurality of cylinders is used, is in proper order to cause as nearly a continuous driving impulse to the crank shaft as possible. It is not to be understood that my invention is limited in any way to a plurality of cylinders, for my invention is applicable to an engine structure having but one cylinder and piston, since an outward thrust of the piston may be exerted for each rotation of the crank shaft, through an arc somewhat less than 180 degrees.

My invention is intended to simplify the usual form of steam engines which require generation in an external boiler which adds greatly to the size and weight of the structure essential for generation, the function of the latter being provided for by heating the liquid by the coils 36 in the concave surfaces of the plate 37 by electric current in the various cylinders rather than in a separate boiler. This is intended to not only reduce the weight and size of apparatus required, but also will reduce the expense of construction and operation. This is not only true, but my abbreviated structure will further provide for steam power where electric current is available, but space and proper control including suitable fuel, is not readily provided.

While some of the details of my structure are not regarded as entirely essential, as for example, the form of resistance coils 36 for generation of steam in the cylinders, need not be the particular form illustrated, the form shown is regarded as practicable, and the general arrangement of parts is that I propose to use in actual operation.

Having thus described my invention, what I claim as new and desire to secure by Letters Patent is:

1. The combination of a steam engine having a cylinder, piston, crank shaft and apertured cylinder head, a resistance coil mounted within the cylinder and adjacent the cylinder head, a rotatable valve shaft connected with and spaced from the cylinder head having means on its periphery for directing small quantities of liquid to an aperture in the cylinder head and depositing the liquid upon the coil intermittently, means for actuating the valve shaft from the crank shaft and conductors connected with a source of electrical energy for continuously heating the said coil, 2. The combination in a steam engine having a piston, crank shaft, cylinder and cylinder head, of a rotatable valve at right angles to and somewhat spaced from the cylinder head, and an insulating support plate mounted within the cylinder adjacent the cylinder head, the said plate having a concave surface on its upper face and having in said concave surface a resistance coil connected with a source of electrical energy for continuously heating the same for generating steam from liquid deposited on said coil, and the said valve having a peripheral depression for intermittently coveying liquid from a point outside the same to the said heating coil.

3. In a steam engine provided with a crank shaft, cylinder, piston and apertured cylinder head, the combination of a cylindrical valve shaft at right angles to the cylinder and spaced from the cylinder head, said valve shaft being provided with peripheral means for feeding liquid from a point adjacent the same to an aperture in the cylinder head as the piston is thrust outward, an insulating plate having a concave surface on one face and a resistance heating coil seated in said concavity, within the cylinder for generating steam from liquid fed to said resistance coil and conductors connected with a source of electrical energy for continuously heating the said coil, there being a port in said valve shaft registering intermittently with an opening in the cylinder head for permitting exit of the exhaust steam upon the inthrow of the piston, and means for driving the valve shaft from said crank shaft.

4. In a steam engine provided with a piston, crank shaft cylinder and cylinder head, the combination of a cup-shaped insulating plate positioned within the cylinder and holding therein a resistance coil connected with a source of electrical energy for continuously heating the said coil, for heating liquid fed thereto and generating steam therefrom, a cylindrical valve shaft mounted at right angles to the cylinder and spaced somewhat from the cylinder head, the said valve shaft being provided with peripheral means for feeding liquid from a point above the same to the said resistance coil and with a port for permitting exit of the exhaust steam from the cylinder, and means connected with said crank shaft for actuating the valve shaft.

5. In a steam engine provided with a plurality of cylinders and pistons, the cylinder heads having alined bores, the combination of a cylindrical valve rotatable in said bores and provided with peripheral means for conveying liquid from a point above the valve to the several cylinders as the pistons are being thrust outward, a cup shaped insulating plate having a resistance coil of radial outline supported in the said plate mounted within each of the several cylinders back of the pistons therein for generating steam from the liquid fed to said resistance coil conductors connected with a source of electrical energy for heating the said coils, and exhaust means for permitting exit of the expanded steam from the cylinders on the inthrow of the pistons.

6. In a steam engine provided with a plurality of cylinders and pistons and cylinder heads having alined bores, the combination of a cylindrical valve rotatable in said bores and provided with peripheral means for feeding liquid from a point above the valve to each of the several cylinders as the pistons are thrust outward, a cup shaped insulating plate having a resistance coil of radial outline supported in the said plate mounted within each of the several cylinders back of the pistons therein for generating steam from the liquid fed thereto, conductors connected with a source of electrical energy for heating the said coils, there being ports in said valve registering with the several cylinders for permitting exit of the exhaust steam from the cylinders on the inthrow of the pistons.

In witness whereof I have hereunto set my hand and seal this 10th day of April, 1926.

FRANK VOREL.